(12) United States Patent
Gamperl

(10) Patent No.: US 11,061,273 B2
(45) Date of Patent: Jul. 13, 2021

(54) DRIVING CIRCUIT FOR A LIGHT-EMITTING DIODE BACKLIGHT AND METHOD FOR DRIVING THE SAME

(71) Applicant: Dialog Semiconductor (UK) Limited, London (GB)

(72) Inventor: David Gamperl, Hartberg (AT)

(73) Assignee: Dialog Semiconductor (UK) Limited, London (GB)

( * ) Notice: Subject to any disclaimer, the term of this patent is extended or adjusted under 35 U.S.C. 154(b) by 0 days.

(21) Appl. No.: 16/125,139

(22) Filed: Sep. 7, 2018

(65) Prior Publication Data

US 2019/0004370 A1 Jan. 3, 2019

Related U.S. Application Data

(63) Continuation of application No. PCT/EP2017/053116, filed on Feb. 13, 2017.

(30) Foreign Application Priority Data

Mar. 10, 2016 (EP) .................................... 16159637

(51) Int. Cl.
*G09G 3/34* (2006.01)
*G02F 1/13357* (2006.01)
(Continued)

(52) U.S. Cl.
CPC ..... *G02F 1/133603* (2013.01); *G09G 3/3406* (2013.01); *G09G 3/3426* (2013.01);
(Continued)

(58) Field of Classification Search
None
See application file for complete search history.

(56) References Cited

U.S. PATENT DOCUMENTS

2011/0285313 A1\* 11/2011 Naito ................... G09G 3/3406
  315/294
2012/0120342 A1\* 5/2012 Uchimoto .............. H05B 45/46
  349/61

(Continued)

FOREIGN PATENT DOCUMENTS

CN 202535272 11/2012
CN 202535272 11/2014
(Continued)

OTHER PUBLICATIONS

Chinese Office Action, Application No. 201780015111.1, Applicant: Dialog Semiconductor (UK) Limited, dated Nov. 19, 2019, 6 pages, and English language translation, 4 pages.
(Continued)

*Primary Examiner* — Roy P Rabindranath
(74) *Attorney, Agent, or Firm* — Saile Ackerman LLC; Stephen B. Ackerman

(57) ABSTRACT

A driving circuit and a method for a backlight using light-emitting diodes, LED, the backlight having a first and second segment is presented.
A driving circuit for an LED backlight with a first and second segment has a first terminal, a second terminal for sensing a first signal, a third terminal for connecting to a first current generating unit for providing a first driving current, a first current regulation circuit, a fourth terminal for sensing a second signal, a fifth terminal for connecting to a second current generating unit, a second current regulation circuit for controlling the second current generating unit, and a control unit which is prepared to adjust the supply voltage and to adjust the first and/or second driving current in dependence on the first and the second signal by means of the first and/or the second current regulation circuits.

7 Claims, 4 Drawing Sheets

(51) Int. Cl.
*H05B 45/10* (2020.01)
*H05B 45/37* (2020.01)
*H05B 45/46* (2020.01)
*H05B 45/48* (2020.01)

(52) U.S. Cl.
CPC ............. *H05B 45/10* (2020.01); *H05B 45/37* (2020.01); *H05B 45/46* (2020.01); *H05B 45/48* (2020.01); *G09G 2330/021* (2013.01); *Y02B 20/30* (2013.01)

(56) References Cited

U.S. PATENT DOCUMENTS

| | | |
|---|---|---|
| 2012/0229045 A1 | 9/2012 | Kikuchi et al. |
| 2014/0192102 A1 | 7/2014 | Im et al. |
| 2014/0292220 A1 | 10/2014 | Trattler |

FOREIGN PATENT DOCUMENTS

| | | |
|---|---|---|
| DE | 10 2011 112 188 | 3/2013 |
| WO | WO 2017/153126 | 9/2017 |

OTHER PUBLICATIONS

Chinese Office Action, Application No. 2017800151111, dated Jun. 9, 2020, 4 pages.

\* cited by examiner

DRIVING CIRCUIT FOR A LIGHT-EMITTING DIODE BACKLIGHT AND METHOD FOR DRIVING THE SAME

This application is a Continuation of: PCT application number PCT/EP2017/053116, filed Feb. 13, 2017, which claims priority to European application number EP16159637.4, filed Mar. 10, 2016, both of which are owned by a common assignee and are herein incorporated by reference in their entirety.

TECHNICAL FIELD

The present application pertains to the field of LED backlights which are used in television sets for lighting the liquid crystal display, LCD.

BACKGROUND

Modern TV sets realize a high resolution. For example, ultra-high definition, UHD, TV sets have a resolution of 4,000 pixels. The backlight in such a TV set is implemented by a number of blocks or segments and each backlight segment lights a section of the LCD which is preferably of rectangular shape. Each segment of the backlight is controlled independently so that it can be dimmed in accordance with the picture content displayed on the LCD. This is known as local dimming. The number of segments varies between 4 and 512, for example. Each of these segments, also designated as channels, is usually formed by one string of LEDs, the string being controlled independently.

SUMMARY

The present application starts out from a state of the implementation of an LED backlight which has a single power supply for powering all segments of the LED backlight. Said power supply can be regulated in a way that the segment with the highest voltage drop defines the level of the supply power. This implies that the other segments with a smaller voltage drop have to dissipate the surplus energy. The heat generated in said segments requires additional external heatsinks. Consequently, the efficiency of the LED backlight is poor.

It is therefore an objective to define a driving circuit for an LED backlight and a method for driving the same which enable enhanced efficiency of the LED backlight.

The objective is achieved by the subject-matter of the independent claims. Embodiments and developments are subject-matter of the dependent claims.

The definitions as described above also apply to the following description unless stated otherwise.

In one embodiment, a driving circuit for a light-emitting diode, LED, backlight with at least a first and a second segment has a first, a second, a third, a fourth and a fifth terminal, a first and a second current regulation circuit and a control unit. The first terminal is adapted for connecting to a power supply unit which in turn can be connected to a first connection point of the first and the second segment for providing a supply voltage. The second terminal is prepared for connecting to a second connection point of the first segment and for sensing a first signal. The third terminal is prepared for connecting to a first current generating unit which is adapted for providing a first driving current to the first segment. The first current regulation circuit is coupled to the second and the third terminal in order to control the first current generating unit. The fourth terminal is prepared for connecting to a second connection point of the second segment and for sensing a second signal. The fifth terminal is adapted for connecting to a second current generating unit for providing a second driving current to the second segment. The second current regulation circuit is coupled to the fourth and the fifth terminal in order to control the second current generating unit. The control unit is prepared to adjust the supply voltage and to adjust the first and/or the second driving current in dependence on the first and/or the second signal by means of the first and/or the second current regulation circuits.

The supply voltage is provided to the first and the second segment by the power supply unit. Additionally, the first segment is provided with the first driving current by the first current generating unit under control of the first current regulation circuit. The second segment is provided with the second driving current by means of the second current generating unit which is under control of the second current regulation circuit. The control unit evaluates the first and the second signal and correspondingly adjusts the supply voltage. Subsequently, the control unit adjusts the first and/or the second driving current depending on measurement results from the first and second signal using the first and/or the second current regulation circuits.

By means of the adjustment of the supply voltage and subsequent continuous measurement of the first and second signals and corresponding adjustment of the first and/or second driving current, a difference in voltage drops between the first and the second segment is reduced. Consequently, less power or heat has to be dissipated in the first and second segment. The driving circuit enables improving the overall efficiency of the driven LED backlight.

In a development, the first signal is sensed depending on a voltage drop across the first segment and the second signal is sensed depending on a voltage drop across the second segment.

The voltage drops across the first and the second segment each depend on the level of the supply voltage, the level of the driving current, as well as the number of LEDs and their forward voltage.

In another development, the first current regulation circuit is adapted to provide a first pulse width modulated signal to the second terminal for adjusting a duty cycle of the first driving current and to provide a first current control signal to the third terminal for adjusting a level of the first driving current. The second current regulation circuit is adapted to provide a second pulse width modulated signal to the fourth terminal for adjusting a duty cycle of the second driving current and to provide a second current control signal to the fifth terminal for adjusting a level of the second driving current.

Based on continuously measuring the voltage drops across the first and the second segments after adjustment of the supply voltage, the control unit realizes an adjustment of the first and/or the second driving current by instructing the first and/or the second current regulation circuit to provide the first and/or second current control signal such that the level of the first and/or the second driving current is reduced and at the same time to provide the first and/or the second pulse width modulated signal such that the duty cycle of the first and/or the second driving current is increased.

Consequently, each segment is provided with a driving current which is regulated to the envisaged operating point of the segment. Thereby less power and heat have to be dissipated in the segments.

In one embodiment an LED backlight arrangement comprises the driving circuit as described above, a power supply unit, the first and the second segment, as well as the first and the second current generating units. The power supply is coupled to the first terminal of the driving circuit. The first segment has a first serial connection of at least two light-emitting diodes, LEDs. The first serial connection is coupled between the first and the second connection point of the first segment. The second segment comprises a second serial connection of at least two LEDs. Therein, the serial connection is coupled between the first and the second connection point of the second segment. The first current generating unit is coupled to the second connection point of the first segment in series to the first segment. The second current generating unit is connected to the second connection point of the second segment in series to the second segment.

The power supply unit supplies first and second segments in a parallel connection. A voltage drop across the first segment which is reflected in the first signal amounts to the sum of forward voltages of the LEDs in the first segment. The voltage drop across the second segment, which is sensed by means of the second signal, amounts to a sum of the forward voltages of the LEDs which make up the second segment. Without any effort in binning of the LEDs used in the first and the second segment in order to have equal forward voltages in all LEDs employed, the voltage drop across the first segment will differ from a voltage drop across the second segment. This difference or variance in voltage drops across the segments of the LED backlight arrangement is advantageously compensated by using the driving circuit described above. Therefore, less effort has to be spent on cooling circuit elements in the first and the second segment which reduces the area required for implementing the driving circuit, e.g. in a printed circuit board, PCB. External heatsinks are no longer necessary. Furthermore, cheaper LEDs can be used as binning of the LEDs becomes redundant with the proposed driving circuit in the LED backlight arrangement.

In a development, the first current generating unit comprises a first adjustable current sink and a first transistor switch. The second current generating unit comprises a second adjustable current sink and a second transistor switch.

The first and/or second adjustable current sink can also be realized by a current source or a resistor, respectively.

In a further development, a controlled terminal of the first transistor switch is connected to the second terminal of the driving circuit and a controlled section of the first transistor switch is coupled between the second connection point of the first segment and the third terminal of the driving circuit. A control terminal of the second transistor switch is connected to the fourth terminal of the driving circuit and a controlled section of the second transistor switch is coupled between the second connection point of the second segment and the fifth terminal of the driving circuit.

In another development, the first adjustable current sink is connected between the third terminal of the driving circuit and a reference potential terminal. The second adjustable current sink is connected between the fifth terminal of the driving circuit and the reference potential terminal.

In another embodiment the first and the second transistor switch each comprises a metal oxide semiconductor field effect transistor, MOSFET, or a bipolar transistor.

Whenever MOSFETs are used, the first signal represents the gate potential of the first transistor switch. The second signal represents the gate potential of the second transistor switch. According to the second option in which bipolar transistors are used, the first signal reflects the base current of the first transistor switch and the second signal represents the base current of the second transistor switch.

In one embodiment a method for driving an LED backlight with at least a first and a second segment comprises the following steps:
  providing a supply voltage and a first driving current to the first segment,
  providing the supply voltage and a second driving current to the second segment,
  reducing a level of the supply voltage until a specifiable second level of the supply voltage is reached or until a first predefined condition in the first or the second segment if fulfilled,
  sensing a first signal in dependence on a voltage drop across the first segment,
  sensing a second signal in dependence on a voltage drop across the second segment,
  determining the maximum of the voltages dropping across the first and the second segment by evaluating the first and the second signal,
  reducing the driving current of the segment with the maximum voltage drop until a second predefined condition in the first or the second segment is reached.

By reducing the supply voltage and subsequently regulating the driving current of the segment with the maximum voltage drop, a variance in voltage drops between the first and the second segment can be compensated. Consequently, the amount of excess energy that normally arises from such variance in voltage drop is greatly reduced which results in an improved overall efficiency in driving the LED backlight.

The method may be implemented in the driving circuit for an LED backlight specified above.

Possibly, the LED backlight which is driven by the proposed method has more than two segments. In that case for each additional segment a signal in dependence on a voltage drop across said segment is sensed. The maximum of all voltage drops across the segments comprised by the LED backlight is determined by evaluating all of these signals. Subsequently, the driving current of the segment with the maximum voltage drop is reduced. It is to be noted that in an LED backlight with more than two segments, more than one segment may have its driving current reduced due to a voltage drop the amount of which is close to the determined maximum.

In a development while reducing the level of the supply voltage, the first predefined condition in the first or the second segment is fulfilled as soon as the first or the second signal is below a predefined threshold.

Said threshold is predefined, for example, as the headroom voltage of the segments of the LED backlight which is driven by the method. Therein the headroom voltage refers to the amount of additional voltage or the voltage reserve which allows for correct operation of the LEDs in the segments.

Consequently, the supply voltage is reduced either by a specifiable amount or until a minimum voltage level with which correct operation of the LEDs in the segments is still assured.

The specifiable amount can be determined beforehand taking into account the number of LEDs in a segment and their forward voltages, for example.

In a further development reducing the level of the supply voltage is completed stepwise. Said reducing comprises after each step of reducing the level of the supply voltage sensing the first signal and sensing the second signal and comparing the first signal and the second signal with the predefined threshold.

In this way it is guaranteed that the supply voltage is not reduced below a minimum level for correct operation.

In another development the supply voltage and the first driving current are provided each at a predefined level. The first driving current is provided in a pulse width modulated manner with a predefined duty cycle. The second driving current is provided at a predefined level and in a pulse width modulated manner with a predefined duty cycle.

In a further development reducing the driving current of the segment with the maximum voltage drop comprises reducing the level of the driving current of the segment with the maximum voltage drop and increasing its duty cycle.

By this, any brightness difference in the segments is avoided.

In another development while reducing the driving current of the segment with the maximum voltage drop the second predefined condition is fulfilled as soon as the first or the second signal reaches the predefined threshold.

During reducing the driving current, the signal of the segment under regulation is supervised for not surpassing the threshold, i.e. the headroom voltage of the segment. This again ensures correct operation of all LEDs in the regulated segment.

In another development reducing the driving current of the segment with the maximum voltage drop and increasing its duty cycle is completed in a stepwise manner. Said reducing comprises after each step of reducing the level of the driving current of the regulated segment and increasing its duty cycle sensing the first signal, sensing the second signal and comparing the first signal and the second signal with the predefined threshold.

The text below explains the proposed driving circuit, LED backlight arrangement and driving method in detail using exemplary embodiments with reference to the drawings. Components and circuit elements that are functionally identical or have the identical effect bear identical reference numbers. In so far as circuit parts or components correspond to one another in function, a description of them will not be repeated in each of the following figures.

DESCRIPTION

Figure 1:
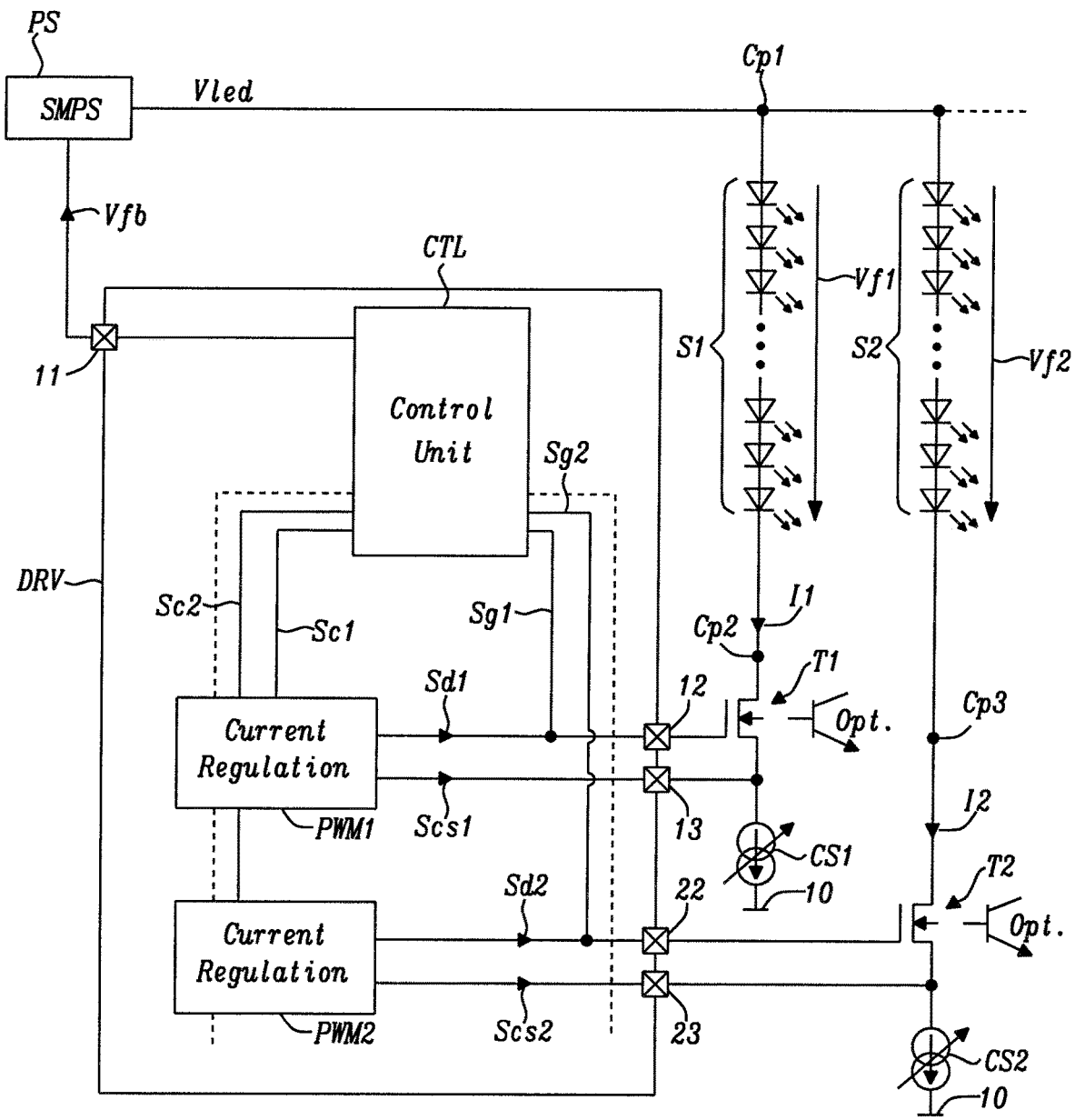
FIG. 1 shows an embodiment example of the proposed LED backlight arrangement with the driving circuit.

FIG. 1 shows an embodiment example of the proposed LED backlight arrangement with the proposed driving circuit. The LED backlight arrangement comprises a driving circuit DRV, a power supply unit PS, a first segment S1, at least a second segment S2, a first current generating unit T1, CS1 and a second current generating unit T2, CS2.

The driving circuit DRV has a first terminal 11 which can be connected to the power supply unit PS, a second terminal 12, a third terminal 13, a first current regulation circuit PWM1, a fourth terminal 22, a fifth terminal 23, a second current regulation circuit PWM2 and a control unit CTL. The first current regulation circuit PWM1 is coupled to the second and the third terminals 12, 13. The second current regulation circuit PWM2 is coupled to the fourth and to the fifth terminal 22, 23. The control unit CTL is coupled to the first and to the second current regulation circuit PWM1, PWM2 and to the first, second and the fourth terminal 11, 12, 22. It is to be noted that the driving circuit DRV is prepared for driving the LED backlight arrangement. Whenever the driving circuit DRV is used for this purpose, it is connected within the LED backlight arrangement as described herein.

The power supply unit PS comprises, for example, a so-called switched mode power supply which may be implemented by a DC/DC converter or an AC/DC converter. The first segment S1 comprises a serial connection of at least two LEDs which are coupled between a first connection point Cp1 and a second connection point Cp2. The first connection point Cp1 is coupled to an output of the power supply unit PS. The second segment S2 comprises a serial connection of at least two LEDs which are coupled between the first connection point Cp1 and a second connection point Cp3 of the second segment S2.

The first current generating unit T1, CS1, comprises a first adjustable current sink CS1 and a first transistor switch T1. A control terminal of the first transistor switch T1 is connected to the second terminal 12 of the driving circuit DRV. A controlled section of the first transistor switch T1 is coupled between the second connection point Cp2 of the first segment S1 and the third terminal 13 of the driving circuit DRV. The first adjustable current sink CS1 is connected between the third terminal 13 of the driving circuit DRV and a reference potential terminal 10. The second adjustable current sink is connected between the fifth terminal 23 of the driving circuit DRV and the reference potential terminal 10. A control terminal of the second transistor switch T2 is connected to the fourth terminal 22 of the driving circuit DRV. A controlled section of the second transistor switch T2 is coupled between the second connection point Cp3 of the second segment S2 and the fifth terminal 23 of the driving circuit DRV.

First and second transistor switches T1, T2 may each be implemented by a MOSFET. In this case the term "control terminal" refers to the gate terminal and the term "controlled section" refers to the drain source section of the transistor in question. In an alternative each of the transistor switches T1, T2 can be realized by a bipolar transistor. In this case the base terminal represents the control terminal and the controlled section extends between emitter and collector terminals.

The power supply unit PS provides a supply voltage Vled to the first and the second segment S1, S2. Under control of the first current regulation circuit PWM1 a first driving current I1 is supplied to the first segment S1 by means of the first current generating unit CS1, T1. In fact, the first current regulation circuit PWM1 provides a first current control signal Scs1 to the third terminal 13 for adjusting a level of the first driving current I1. Furthermore, the first current regulation circuit PWM1 provides a first pulse width modulated signal Sd1 to the second terminal 12 for adjusting a duty cycle of the first driving current I1. Consequently, the first driving current I1 is generated in the first current generating unit T1, CS1 as is known to persons skilled in the art.

In analogy to the first current generating unit CS1, T1, the second current generating unit CS2, T2 generates a second driving current I2 which is provided to the second segment S2. Generation of the second driving current I2 is controlled by the second current regulation circuit PWM2 which provides for this purpose a second current control signal Scs2 to the fifth terminal for adjusting a level of the second driving current I2 and a second pulse width modulated signal Sd2 to the fourth terminal 22 for adjusting a duty cycle of the second driving current I2.

Driving of the first segment S1 with the supply voltage Vled and the first driving current I1 leads to a voltage drop Vf1 across the first segment S1. Similarly, driving the second segment S2 with the supply voltage Vled and the second driving current I2 results in a voltage drop Vf2 across the second segment S2. The voltage drop Vf1 across the first segment S1 is measured at the second terminal 12 and provided as a first signal Sg1 to the control unit CTL of the driving circuit DRV. The voltage drop Vf2 across the second segment S2 is measured at the fourth terminal 22 and is provided as a second signal Sg2 to the control unit CTL of the driving circuit DRV. The control unit CTL in turn provides a feedback signal Vfb via the first terminal 11 to the power supply unit PS in order to adjust the supply voltage Vled.

Furthermore, the control unit CTL provides a first control signal Sc1 to the first current regulation circuit PWM1 in order to adjust the first driving current I1. Similarly, the control unit CTL provides a second control signal Sc2 to the second current regulation circuit PWM2 in order to adjust the second driving current I2. The first control signal Sc1 is provided depending on an evaluation of the first signal Sg1. The second control signal Sc2 is provided depending on an evaluation of the second signal Sg2. The first pulse width modulated signal Sd1 and the first current control signal Scs1 are provided as a function of the first control signal Sc1. Moreover, the second pulse width modulated signal Sd2 and the second current control signal Scs2 are provided as a function of the second control signal Sc2.

Functioning of the LED backlight arrangement with the driving circuit DRV is explained below in detail by means of the method depicted in FIG. 2 and the circuits of FIGS. 3A and 3B.

Figure 2:
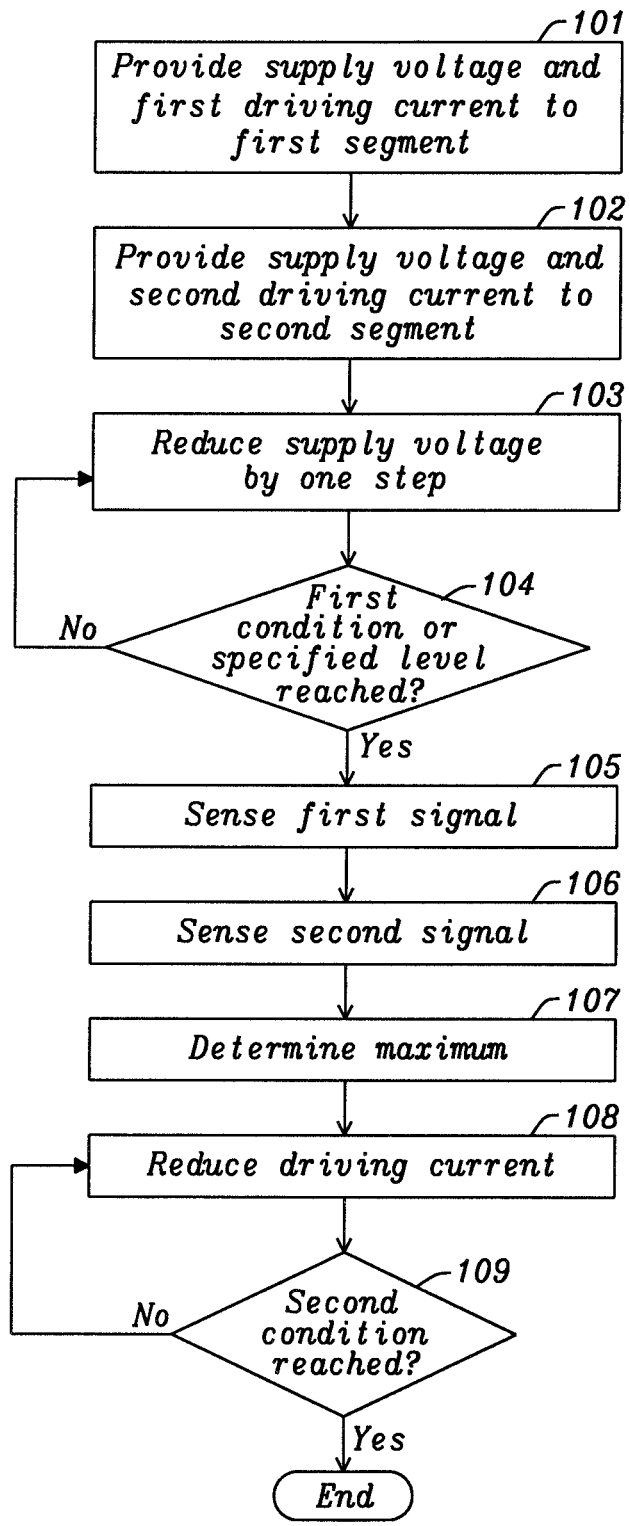
FIG. 2 shows an embodiment example of the proposed method.

FIG. 2 shows an embodiment example of a method for driving an LED backlight with at least a first and a second segment as proposed. By way of example, the method is implemented using the LED backlight arrangement and driving circuit depicted in FIG. 1.

The method starts out with step 101 in which the supply voltage Vled is provided to the first segment S1. Also, the first driving current I1 is provided to the first segment S1.

In step 102 the supply voltage Vled and the second driving current I2 are provided to the second segment S2.

Figure 3A:
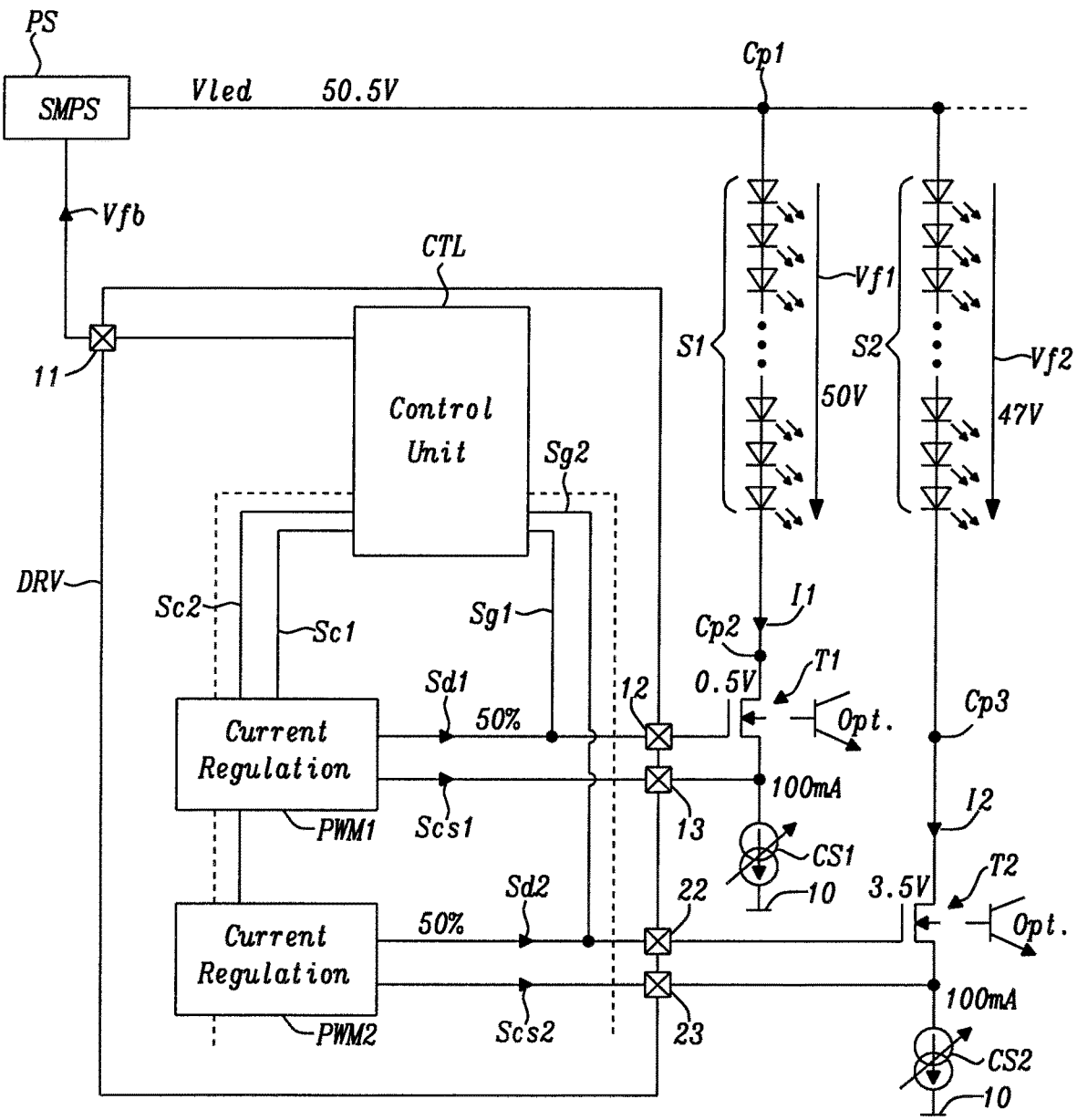
FIG. 3A shows the situation in the embodiment of FIG. 1 at the beginning of the proposed method.

FIG. 3A shows details regarding voltage and current levels at the beginning of the execution of the method. It can be seen that the supply voltage Vled is provided with 50.5 V. First and second current sinks CS1, CS2 are adjusted to provide the first driving current I1 and the second driving current I2, respectively, at a level of 100 rnA. It can further be discerned that the duty cycle of first and second driving currents I1, I2 is pre-adjusted to 50%. The resulting voltage drop Vf1 across the first segment S1 amounts to 50 V. The resulting voltage drop Vf2 across the second segment S2 amounts to 47 V. Therefore, the voltage of the drain terminal of the first transistor switch T1 is at 0.5 V, whereas the voltage at the drain terminal of the second transistor switch T2 is at 3.5 V. The regulation which is described in the following steps aims at compensating this difference in the voltage drops between the first and the second segments S1, S2.

The voltages at the drain terminals of first and second transistor switches T1, T2 are reflected in the first and the second signal Sg1, Sg2, respectively.

In step 103 the supply voltage Vled is reduced by one step. First and second signals Sg1, Sg2 are sensed and are each compared to a predefined threshold. This predefined threshold defines the operating point of the first and the second transistor switch T1, T2 under a condition of which the LEDs of the first and the second segments S1, S2 work with the desired brightness. In an exemplary implementation, the predefined threshold roughly corresponds to the threshold voltage of the first and second transistor switch T1, T2.

In step 104 it is checked whether the first or the second signal Sg1, Sg2 is below the predefined threshold. Alternatively, it is tested whether the supply voltage Vled has already been reduced to a level which has been specified in advance taking into account the number of LEDs in a segment and their forward voltages. As long as neither of these tests proves positive, the supply voltage Vled is further reduced and steps 103 and 104 are repeated. In between two steps of reducing the supply voltage Vled settlement of the power supply unit PS to the new value is awaited.

Figure 3B:
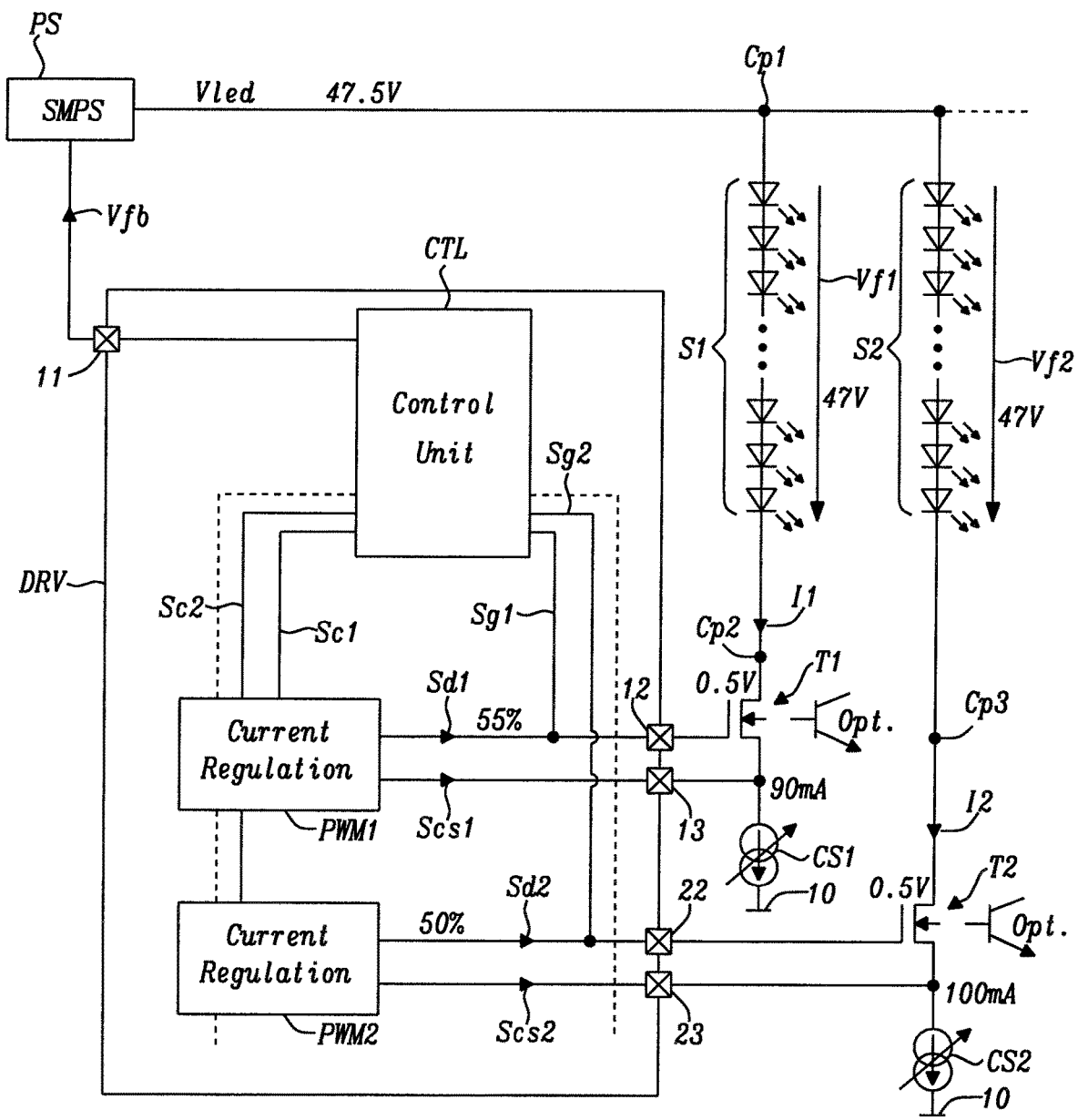
FIG. 3B shows the situation in the embodiment of FIG. 1 after execution of the proposed method.

FIG. 3B shows that the supply voltage is consequently reduced to 47.5 V.

As soon as the first or the second signal Sg1, Sg2 is below the predefined threshold or when the supply voltage Vled has reached the specified lower level, first and second signals are sensed again in steps 105 and 106.

In step 107 the maximum voltage drop Vf1, Vf2 across the first or the second segment S1, S2 is determined by comparing first and second signals Sg1, Sg2.

Next, in step 108, the driving current of the segment with the maximum voltage drop is reduced step by step. In the depicted circuit of FIG. 3B the first segment S1 has its driving current regulated. For this purpose, the level of the first driving current I1 is reduced stepwise and finally is adjusted to 90 rnA by means of the first current control signal Scs1. Concurrently, the duty cycle of the first driving current I1 is adjusted to 55% by means of the first pulse width modulated signal Sd1. The resulting values of voltage drops Vf1, Vf2 in the segments amounts to 47 V, as depicted in FIG. 3B.

After each step 108 of reducing the driving current of the segment in question in step 109 it is checked whether the second predefined condition is fulfilled, i.e. whether the first or the second signal Sg1, Sg2 reaches the level of the headroom voltage. As soon as the signal of the segment which has its driving current regulated has reached the threshold, for example, 3 V, the compensation is completed and the method ends.

It can be gathered from FIG. 3B that the voltage at the drain terminals of first and second transistor switch T1, T2 is equalized to 0.5 V after completion of the method.

In an alternative embodiment of the method, the order of the steps is modified such that after steps 101 and 102, the first and the second signal is sensed according to steps 105 and 106 and the maximum voltage drop is determined according to step 107. Subsequently, the supply voltage is reduced until the predefined condition is fulfilled or the second level is reached according to steps 103 and 104. Finally, the driving current is reduced as of steps 108 and 109.

In another alternative embodiment of the method, the order of the steps is modified such that after steps 101 and 102, the first and the second signal is sensed according to steps 105 and 106 and the maximum voltage drop is determined according to step 107. Subsequently, the driving current is reduced as of steps 108 and 109. Finally, the supply voltage is reduced until the predefined condition is fulfilled or the second level is reached according to steps 103 and 104.

It is to be understood that any feature described in relation to any one embodiment may be used alone, or in combination with other features described, and may also be used in combination with one or more features of any other of the embodiments, or any combination of any other of the embodiments unless described as alternative. Furthermore, equivalents and modifications not described above may also be employed without departing from the scope of the driving circuit, LED backlight arrangement and method which are defined in the accompanying claims.

REFERENCE LIST 10 reference potential terminal
11, 12, 13, 22, 23 terminal of driving circuit
DRV driving circuit
PWM1, PWM2 current regulation circuit
CTL control unit
PS power supply unit
S1, S2 segment
CS1, CS2 current sink
T1, T2 transistor switch
Cp1, Cp2, Cp3 connection point
Vled supply voltage
Vf1, Vf2 voltage drop
Sg1, Sg2, Sd1, Sd2 signal
Sc1, Sc2, Scs1, Scs2 signal
Vfb signal
I1, I2 driving current
101, 102, 103, 104, 105 step
106' 107, 108, 109 step

What is claimed is:

1. A driving circuit for a light-emitting diode, LED, backlight with at least a first and a second segment, the driving circuit having
    a first terminal for connecting to a power supply unit which in turn can be connected to a first connection point of the first and the second segment for providing a supply voltage,
    a second terminal for connecting to a second connection point of the first segment and for sensing a first signal,
    a third terminal for connecting to a first current generating unit for providing a first driving current to the first segment,
    a first current regulation circuit which is coupled to the second and the third terminals in order to control the first current generating unit,
    a fourth terminal for connecting to a second connection point of the second segment and for sensing a second signal,
    a fifth terminal for connecting to a second current generating unit for providing a second driving current to the second segment,
    a second current regulation circuit which is coupled to the fourth and to the fifth terminals in order to control the second current generating unit,
    a control unit which is prepared to adjust the supply voltage and to adjust the first and/or second driving current in dependence on the first and the second signals by means of the first and/or the second current regulation circuits,
    wherein the first current generating unit comprises a first adjustable current sink and a first transistor switch, and
    wherein the second current generating unit comprises a second adjustable current sink and a second transistor switch.

2. The driving circuit according to claim 1 wherein the first signal is sensed depending on a voltage drop across the first segment and the second signal is sensed depending on a voltage drop across the second segment.

3. A driving circuit for a light-emitting diode, LED, backlight with at least a first and a second segment, the driving circuit having
    a first terminal for connecting to a power supply unit which in turn can be connected to a first connection point of the first and the second segment for providing a supply voltage,
    a second terminal for connecting to a second connection point of the first segment and for sensing a first signal,
    a third terminal for connecting to a first current generating unit for providing a first driving current to the first segment,
    a first current regulation circuit which is coupled to the second and the third terminals in order to control the first current generating unit,
    a fourth terminal for connecting to a second connection point of the second segment and for sensing a second signal,
    a fifth terminal for connecting to a second current generating unit for providing a second driving current to the second segment,
    a second current regulation circuit which is coupled to the fourth and to the fifth terminals in order to control the second current generating unit,
    a control unit which is prepared to adjust the supply voltage and to adjust the first and/or second driving current in dependence on the first and the second signals by means of the first and/or the second current regulation circuits,
    wherein the first current regulation circuit is adapted to provide a first pulse-width modulated signal to the second terminal for adjusting a duty-cycle of the first driving current and to provide a first current control signal to the third terminal for adjusting a level of the first driving current, and wherein the second current regulation circuit is adapted to provide a second pulse-width modulated signal to the fourth terminal for adjusting a duty-cycle of the second driving current and to provide a second current control signal to the fifth terminal for adjusting a level of the second driving current.

4. An LED backlight arrangement comprising
    A driving circuit for a light-emitting diode, LED, backlight with at least a first and a second segment, the driving circuit having
    a first terminal for connecting to a power supply unit which in turn can be connected to a first connection point of the first and the second segment for providing a supply voltage,
    a second terminal for connecting to a second connection point of the first segment and for sensing a first signal,
    a third terminal for connecting to a first current generating unit for providing a first driving current to the first segment,
    a first current regulation circuit which is coupled to the second and the third terminals in order to control the first current generating unit,
    a fourth terminal for connecting to a second connection point of the second segment and for sensing a second signal, a fifth terminal for connecting to a second current generating unit for providing a second driving current to the second segment, a second current regulation circuit which is coupled to the fourth and to the fifth terminals in order to control the second current generating unit, a control unit which is prepared to adjust the supply voltage and to adjust the first and/or second driving current in dependence on the first and the second signals by means of the first and/or the second current regulation circuits the power supply unit coupled to the first terminal of the driving circuit, the first segment comprising a first serial connection of at least two light-emitting diodes, the first serial connection being coupled between the first and the second connection points of the first segment, the second segment comprising a second serial connection of at least two light-emitting diodes, the second serial connection being coupled between the first and the second connection point of the second segment, the first current generating unit coupled to the second connection point of the first segment in series to the first segment, and the second current generating unit coupled to the second connection point of the second segment in series to the second segment, wherein the first current generating unit comprises a first adjustable current sink and a first transistor switch, and wherein the second current generating unit comprises a second adjustable current sink and a second transistor switch.

5. The LED backlight arrangement according to claim 4, wherein a control terminal of the first transistor switch is connected to the second terminal of the driving circuit and a controlled section of the first transistor switch is coupled between the second connection point of the first segment and the third terminal of the driving circuit, and wherein a control terminal of the second transistor switch is connected to the fourth terminal of the driving circuit and a controlled section of the second transistor switch is coupled between the second connection point of the second segment and the fifth terminal of the driving circuit.

6. The LED backlight arrangement according to claim 4, wherein the first adjustable current sink is connected between the third terminal of the driving circuit and a reference potential terminal, and wherein the second adjustable current sink is connected between the fifth terminal of the driving circuit and the reference potential terminal.

7. The LED backlight arrangement according to any of claim 4, wherein the first and the second transistor switch each comprises a metal-oxide semiconductor field-effect transistor, MOSFET, or a bipolar transistor.

\* \* \* \* \*